United States Patent [19]

Matsuda et al.

[11] 4,255,766
[45] Mar. 10, 1981

[54] FACSIMILE SIGNAL SUPERPOSING SYSTEM

[75] Inventors: Hideo Matsuda; Kiyohiro Yuki; Takashi Kawade; Takaaki Adachi, all of Yokosuka; Kenichi Hanabe, Yokohama, all of Japan

[73] Assignee: Nippon Telegrpah and Telephone Public Corporation, Toyko, Japan

[21] Appl. No.: 56,287

[22] Filed: Jul. 10, 1979

[30] Foreign Application Priority Data

Jul. 10, 1978 [JP] Japan .................................. 53-82926
Jul. 10, 1978 [JP] Japan .................................. 53-82927
Aug. 14, 1978 [JP] Japan .................................. 53-98814
Aug. 14, 1978 [JP] Japan .................................. 53-98815

[51] Int. Cl.³ ......................... H04N 1/32; H04N 3/22
[52] U.S. Cl. ..................................... 358/257; 358/183
[58] Field of Search ................ 358/93, 183, 256, 257, 358/258

[56] References Cited

U.S. PATENT DOCUMENTS

| 3,465,097 | 9/1969  | Bradon et al. | 358/183 |
| 3,532,806 | 10/1970 | Wicklund      | 358/183 |
| 3,617,630 | 11/1971 | Reiffel       | 358/93  |
| 3,891,792 | 6/1975  | Kimura        | 358/183 |

Primary Examiner—Marc E. Bookbinder
Assistant Examiner—Edward L. Coles
Attorney, Agent, or Firm—Armstrong, Nikaido, Marmelstein & Kubovcik

[57] ABSTRACT

A facsimile signal superposing system for an analog type modulated facsimile signal has been found. The present superposing system has a digital memory storing the pattern to be superposed, and the insertion circuit which has a first input terminal for receiving the original facsimile pattern, a second input terminal for receiving the output of said digital memory, and an output terminal providing the sum of the first and the second input terminal signals. The cells of the digital memory are read one after another substantially synchronized with the original picture signal, thus, a superposed facsimile signal is obtained at said output terminal. The additional pattern to be superposed is, for instance, the date of the facsimile transmission.

5 Claims, 13 Drawing Figures

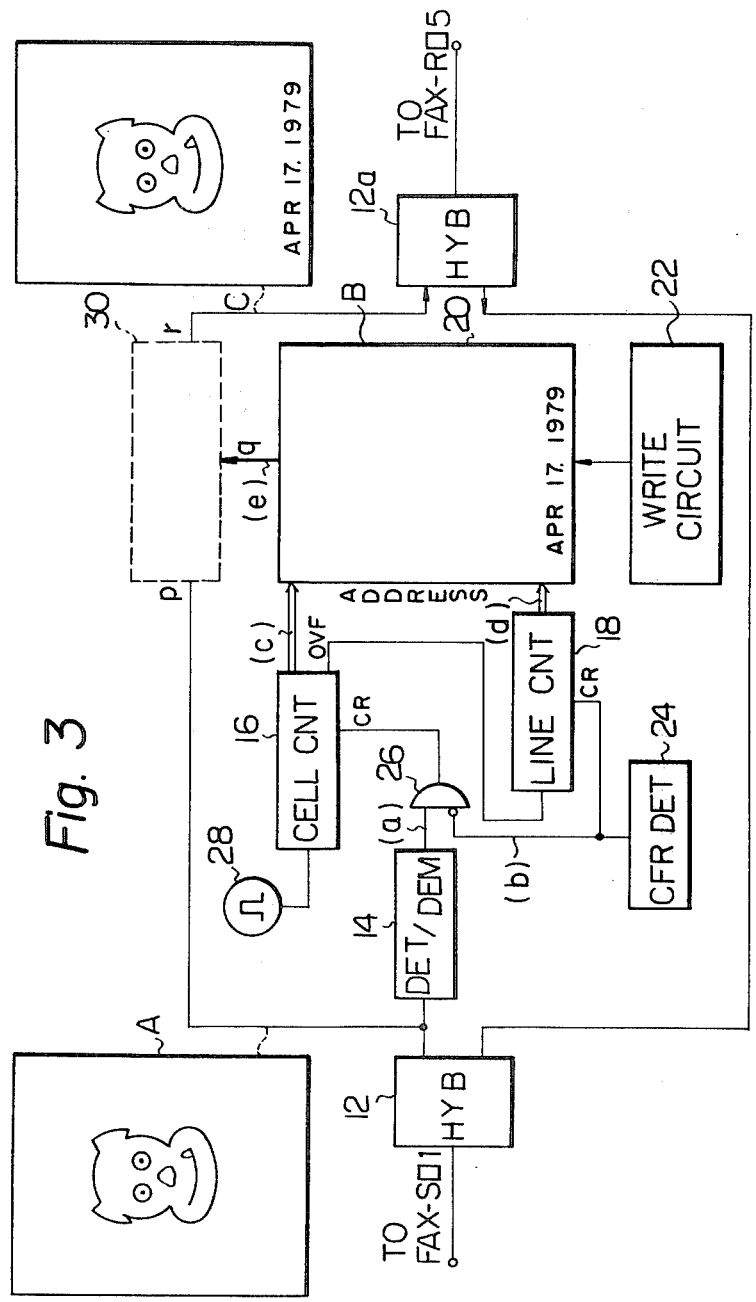

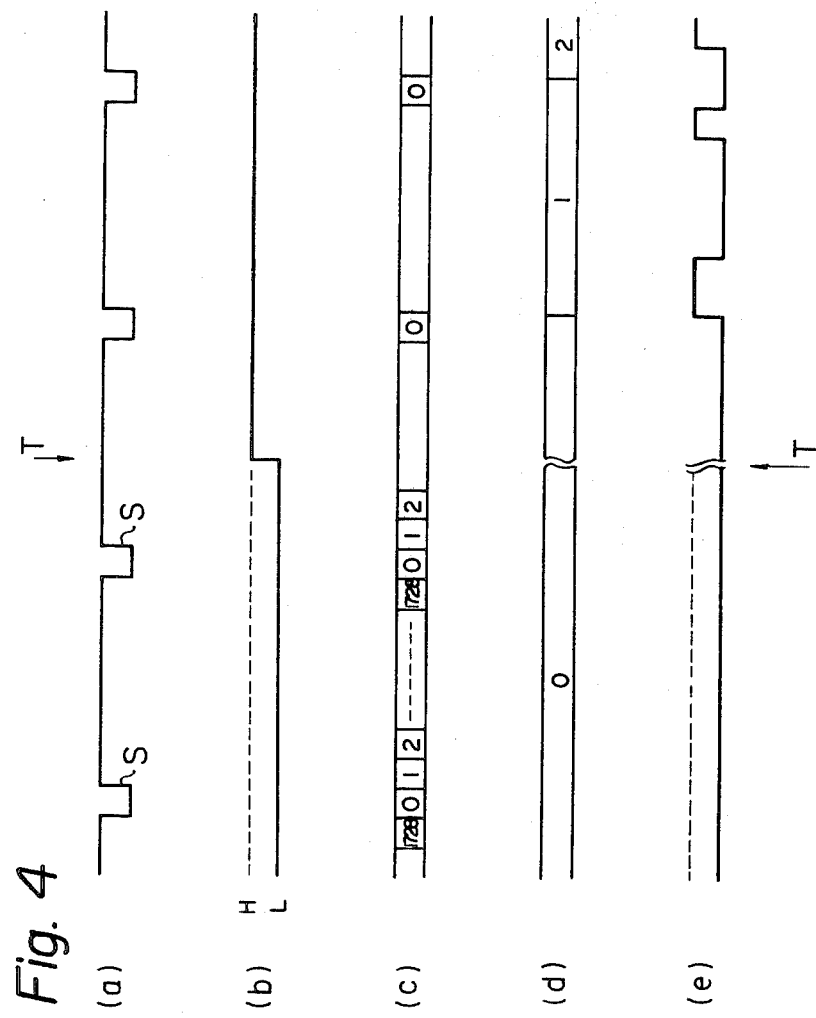

FACSIMILE SIGNAL SUPERPOSING SYSTEM

BACKGROUND OF THE INVENTION

The present invention relates to a system to superpose a picture and/or a character pattern on an original facsimile pattern which is in the modulated analog signal form of amplitude modulation (AM), amplitude-phase modulation (AM-PM), frequency modulation (FM) and/or phase modulation (PM).

In a facsimile transmission system and/or a facsimile exchange system, superposition of an additional pattern on the original facsimile pattern is sometimes required. That additional pattern is, for instance, the date and/or the time that the facsimile signal is transmitted, calling subscriber recognition information, charge information, or other comments for communication purposes.

According to a prior apparatus of this kind, a modulated facsimile signal is temporarily received by a facsimile receiver, and the baseband signal in the analog form thus obtained is converted to a digital form through digital sampling process. Then the facsimile signal in the digital form thus obtained is added logically to a character signal in the digital form obtained from the control apparatus for character generation, and then the resultant logical sum is transmitted through a facsimile transmitter.

However, said prior facsimile superposition system has the disadvantages that a facsimile transmittes is necessary, thus the system structure is complicated, and further a picture quality is deteriorated since a facsimile signal is converted to a baseband signal for digital sampling.

SUMMARY OF THE INVENTION

It is an object, therefore, of the present invention to overcome the disadvantages and limitations of a prior facsimile superposing system by providing a new and improved facsimile superposing system.

It is also an object of the present invention to provide a facsimile superposing system in which an additional pattern is superposed on an original pattern without demodulating the original facsimile signal. That is to say, the analog type facsimile signal modulated by amplitude modulation, amplitude-phase modulation, frequency modulation, and/or phase modulation is directly superposed with an additional pattern.

The above and other objects are attained by a facsimile superposing system for superposing an additional pattern on an original pattern comprising an input means for receiving the analog type modulated original facsimile pattern signal, a digital memory storing the additional pattern to be superposed, an insertion circuit having a first input terminal connected to said input means, a second input terminal connected to the output of said digital memory and an output terminal for providing the sum of the first and the second input terminal signals, an address circuit for addressing said memory, and output means connected to said output terminal of said insertion circuit.

BRIEF DESCRIPTION OF THE DRAWINGS

The foregoing and other objects, features, and attendant advantages of the present invention will be understood by means of the following description and accompanying drawings wherein;

FIG. 3 shows the block-diagram of the embodiment of the facsimile superposing apparatus according to the present invention, FIG. 4 shows the operational timing sequence of the apparatus in FIG. 3, FIGS. 5(A), 5(B) and 5(C) are some embodiments of the insertion circuit 30 in FIG. 3, FIGS. 6, 7 and 8 are waveforms of the insertion circuits in FIGS. 5(A), 5(B) and 5(C), respectively.

DESCRIPTION OF THE PREFERRED EMBODIMENTS

Figure 1:
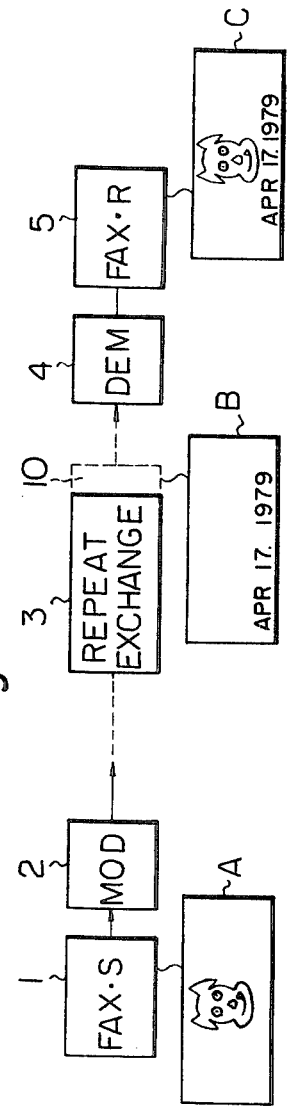
FIG. 1 shows the general block-diagram of the facsimile exchange system according to the present invention.

FIG. 1 shows the general block-diagram of a facsimile exchange system utilizing the present invention, in which the reference numeral 1 is the facsimile transmitter, 2 is the modulator for modulating the facsimile base band signal from the facsimile transmitter 1 by AM (amplitude modulation), AM-PM (amplitude-phase modulation), FM (frequency modulation), or PM (phase modulation). 3 is the facsimile exchange apparatus and/or the facsimile repeater, 4 is the demodulator for recovering the facsimile base band signal from the modulated signal, and 5 is the facsimile receiver. Also, 10 is the facsimile superposing apparatus inserted in the transmission line between the output of the modulator 2 and input of the demodulator 4. Supposing that the original pattern at the facsimile transmitter 1 is the pattern (A) and the additional pattern to be superposed at the facsimile superposing apparatus is the pattern (B), then the superposed pattern at the facsimile receiver 5 is the pattern (C), which is the summation of the pattern (A) and the pattern (B). The present invention relates to superposing a pattern as described. It should be understood in FIG. 1, that the facsimile signal is not processed through a complicated digital information processing technique, but is transmitted in a simple analog form and is superposed with an additional pattern.

Figure 2:
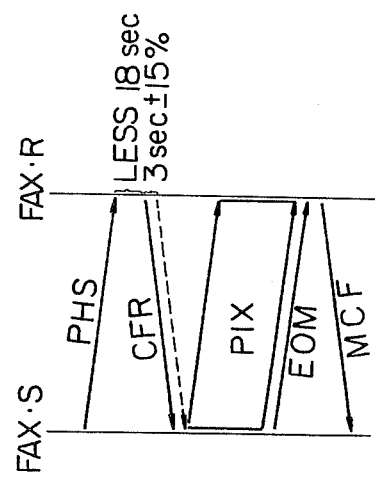
FIG. 2 shows the transmission control procedure of a typical facsimile transmission system.

FIG. 2 shows the transmission control procedure of a typical facsimile transmission system according to recommendation T30 of CCITT (International Telegraph and Telephone Consultive Committee which is a subsidiary organization of the United Nations). In FIG. 2, the facsimile transmitter (FAX-S) forwards the phasing signal (PHS) which is the repetition of the 0-phase signal and the $\pi$-phase signal for synchronization between the transmission side and the reception side. Said 0-phase signal and the $\pi$-phase signal are 2,100±10 Hz in said recommendation with a duration of less than 6 seconds, and the beginning point of either 0-phase signal or $\pi$-phase signal is the reference point of the synchronization. When the reception side assures that reference point and synchronization is established between two stations, the reception side returns the "confirmation to receive" signal (CFR) which is 1080 Hz and continues for 3 seconds ±3%. When the transmission side receives the CFR signal, the transmission side recognizes that the reception side is ready to receive a picture and synchronization has been established, so the transmission side starts to forward a picture signal (PIX). When the transmission side finishes forwarding the picture signal, the EOM (end of message) signal is forwarded from the transmission side to the reception side, and the MCF (message confirmation) signal is returned from the reception side to the transmission side. Thus, when the transmission side receives the MCF signal, the sequence of facsimile transmission procedures finishes.

Accordingly, the facsimile superposing apparatus 10 according to the present invention must operate in coincidence with said facsimile transmission procedure.

FIG. 3 shows the block-diagram of the embodiment of the facsimile superposing apparatus according to the present invention. In the figure, the reference numerals 12 and 12a are hybrid circuits for converting the two-wire system to a four-wire system or a four-wire system to a two-wire system. The two-wire end of the first hybrid circuit 12 is connected to the facsimile transmitter through the transmission circuit and the modulator, and the two-wire end of the other hybrid circuit 12a is connected to the facsimile receiver through the transmission circuit and the demodulator. 14 is the detector/demodulator, 16 is the digital cell counter which has a bit capacity equal to the number of picture cells in each scanning line of a facsimile picture. 18 is a line counter which has a bit capacity equal to the cells in the vertical direction of a facsimile picture, and is incremented by an overflow pulse of said cell counter 16. 20 is the digital memory for storing the pattern to be superposed (see the symbol (B) in FIG. 1), and said memory is a read-only-memory (ROM) or a random access memory (RAM). The address for reading out said memory is determined by the outputs of said cell counter 16 and the line counter 18. 22 is the memory-write circuit for changing the content of the memory. The change of content of the memory is performed when the pattern to be superposed must be changed, for instance, when the pattern to be superposed is a date, that date must be changed every day. 24 is the CFR detector, 26 is the AND circuit, 28 is the cell clock generator which generates a frequency signal equal to the scanning frequency of the picture signal, and 30 is the signal insertion circuit which superposes the additional pattern from the second input terminal of the line (q) on the original pattern of the first input terminal of the line (p), thus the superposed pattern is provided at the output terminal on the line (r). The structure of the insertion circuit depends upon the modulation system of the facsimile system (AM, AM-PM, FM, or PM), and will be described later.

At the initial status, it is supposed that the output of the CFR detector 24 is "low", then the AND circuit 26 is open, and the line counter 18 is cleared through the CR terminal. Then the output (q) of the memory 20 is "low" level. It is assumed that the input terminal (p) is directly connected to the output terminal (r) of the insertion circuit when the output (q) of the memory 20 is "low", and when said output (q) of the memory 20 is "high", the output (q) of said memory 20 is applied to the output (r) of the insertion circuit 30. The cell counter 16 is cleared through the terminal CR every time the synchronization signal from a facsimile transmitter is provided at the output of the detector/demodulator 14 until the CFR signal is detected. Then the content of the cell counter 16 is incremented by the output of the cell clock generator 28 and said content reaches full (for instance, 1728) when next synchronization signal appears on the output of the detector/demodulator 14.

FIG. 4 (in particular the left half of FIG. 4) shows the sequence of the above operation, in which (a) is the output of the detector/demodulator 14 which provides the synchronization signal (S), (b) is the output of the CFR detector 24, (c) is the output of the cell counter 16, (d) is the output of the line counter 18, and (e) is the output of the memory 20.

Accordingly, it should be understood that when no CFR signal is detected, the first hybrid circuit 12 is directly connected to the second hybrid circuit 12a through the insertion circuit 30, thus the superposition apparatus in FIG. 3 does not affect to the transmission line. Therefore, the PHS signal (FIG. 2) can go through the apparatus freely.

Next, when a facsimile receiver returns the CFR signal, said signal is detected by the CFR detector 24 at the time (T) in FIG. 4, then the output of the CFR detector changes to "high" level (see FIG. 4(b)). Thus, the line counter 18 and the cell counter 16 are not cleared, instead, the content of the cell counter 16 and the line counter 18 indicate the address of the cell which corresponds to the instantaneous scanning signal of the facsimile signal. According to the address thus indicated, the memory 20 provides the output signal which is applied to the insertion circuit 30 and the pattern from the memory 20 is superposed on the original pattern.

Now, the structure and the operation of the insertion circuit 30 will be described.

Figure 5A:
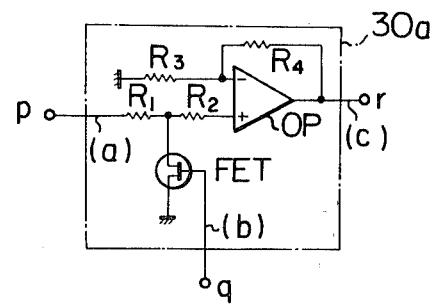
Figure 5B:
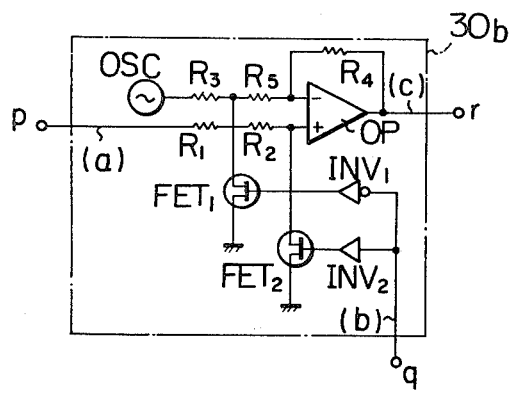
Figure 5C:
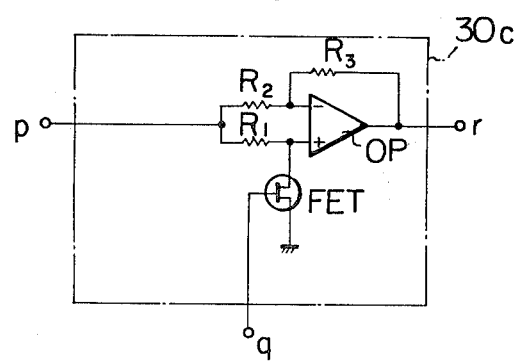

In FIGS. 5(A), 5(B) and 5(C), OP shows an operational amplifier, $R_1$, $R_2$, $R_3$, $R_4$ and $R_5$ are resistors, FET, $FET_1$ and $FET_2$ are field effect transistors, and the terminals p, q and r correspond to the same symbols of the insertion circuit in FIG. 3.

Figure 6:
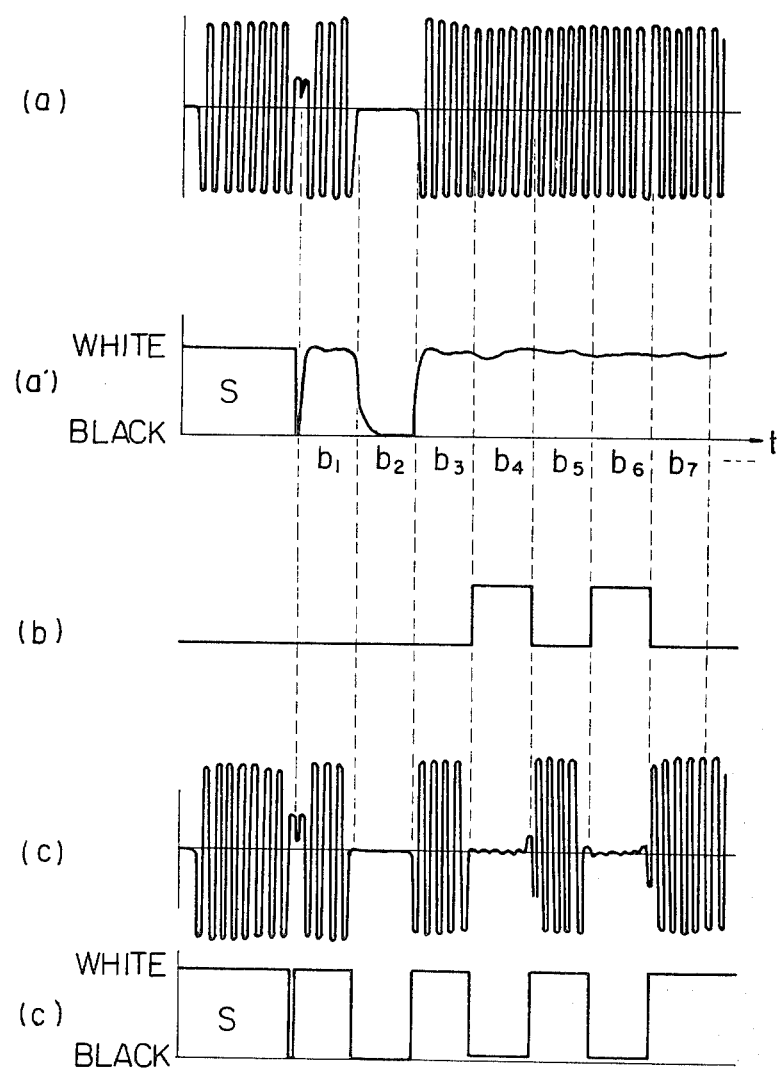

FIG. 5(A) is the first embodiment of the insertion circuit which is utilized for AM (amplitude modulation), or AM-PM (amplitude-phase modulation) modulated facsimile signals. In FIG. 5(A), when the level at the terminal (q) is "low", the FET is cut off and the input terminal (p) is directly connected to the output terminal (r) through the operational amplifier, thus, the AM waveform of the facsimile signal (see FIG. 6(a)) is directly output to the terminal (r). On the other hand, when the terminal (q) is in the "high" state (see FIG. 6(b)), then the FET conducts and the terminal (p) is grounded through said field effect transistor FET. Therefore, the input signal at the terminal (p) does not appear at the output terminal. Thus, the amplitude of the input signal is suppressed. The suppression of the input signal causes the picture signal to change from white to black. In the waveforms in FIG. 6, the waveform (a) is the AM modulated facsimile signal, (a') is the base band signal of the waveform (a), (b) is the additional signal to be inserted on the terminal (q), (c) is the superposed output signal on the terminal (r) and (c') is the base band signal of the waveform (c). In those drawings, it should be understood that the picture signals $b_4$ and $b_6$ are suppressed.

FIG. 5(B) is the second embodiment of the insertion circuit in FIG. 3, and is utilized for AM, AM-PM or FM modulated facsimile signals. In FIG. 5(B), according to the level on the insertion terminal (q), the field effect transistors $FET_1$ and $FET_2$ are cut off or conductive. When the first field effect transistor $FET_1$ is conductive, the output of the oscillator is grounded, and when the second field effect transistor $FET_2$ is conductive the terminal (p) is grounded. Of course the grounded signal does not appear on the output terminal (r). Therefore, according to the level at the terminal (q), either the input terminal (p) or the output of the oscillator OSC is connected to the output terminal (r) through the operational amplifier OP. The frequency of the oscillator OSC is the same as that of the picture signal in the AM or AM-PM systems, or said frequency is the same as the black frequency or the white frequency in the FM system.

Figure 7:
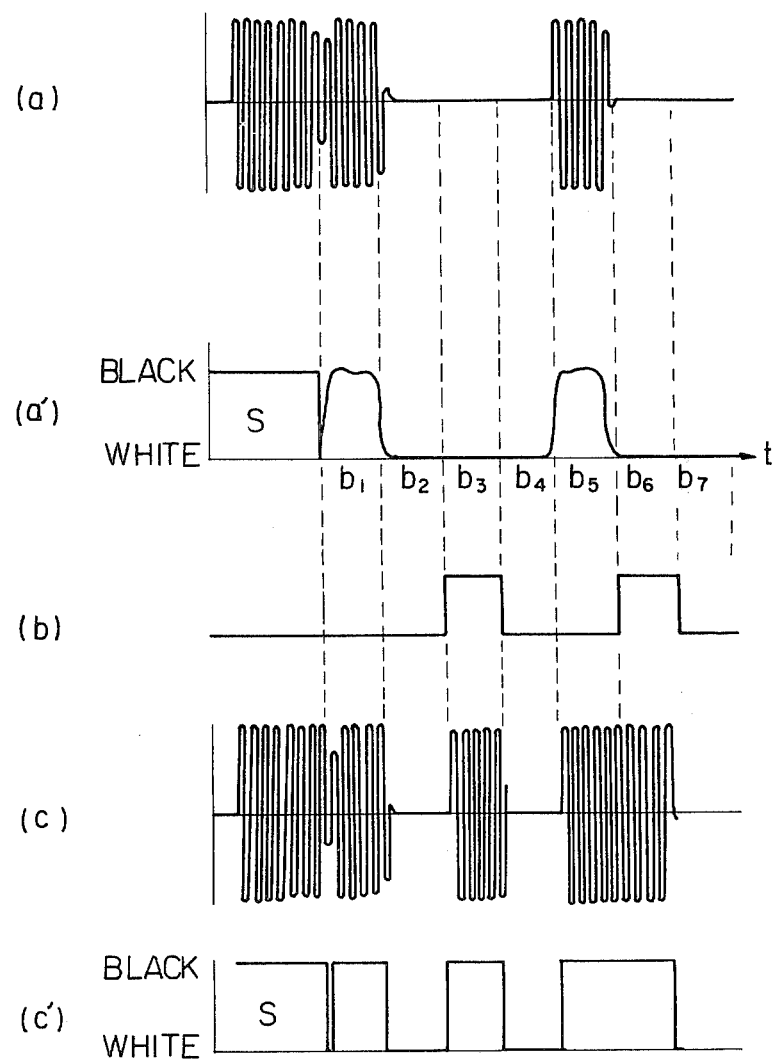

FIG. 7 shows the operational waveforms of the circuit in FIG. 5(B), and (a) shows the input waveform at the input terminal (p), (a') is the base band signal of the waveform (a), (b) is the additional signal at the terminal (q), (c) is the superposed output signal at the output terminal (r), and (c') is the base band signal of the waveform (c). It should be understood in FIG. 7, that the signals are superposed at the cells $b_3$ and $b_6$.

FIG. 5(C) is the third embodiment of the insertion circuit according to the present invention, and this embodiment is utilized for AM-PM, or PM modulated facsimile signals. In FIG. 5(C), the input signal applied to the negative terminal (−) of the operational amplifier OP, is inverted while the signal applied to the positive terminal (+) of the operational amplifier OP is not inverted in the operational amplifier. Therefore, by designing the value of the resistance of $R_1$, $R_2$ and $R_3$ appropriately, the inverted signal is obtained when the FET is conductive, while the non-inverted signal is obtained when the FET is cutoff. Thus, the signal at the insertion terminal (q) can control the phase at the output terminal (r).

Figure 8:
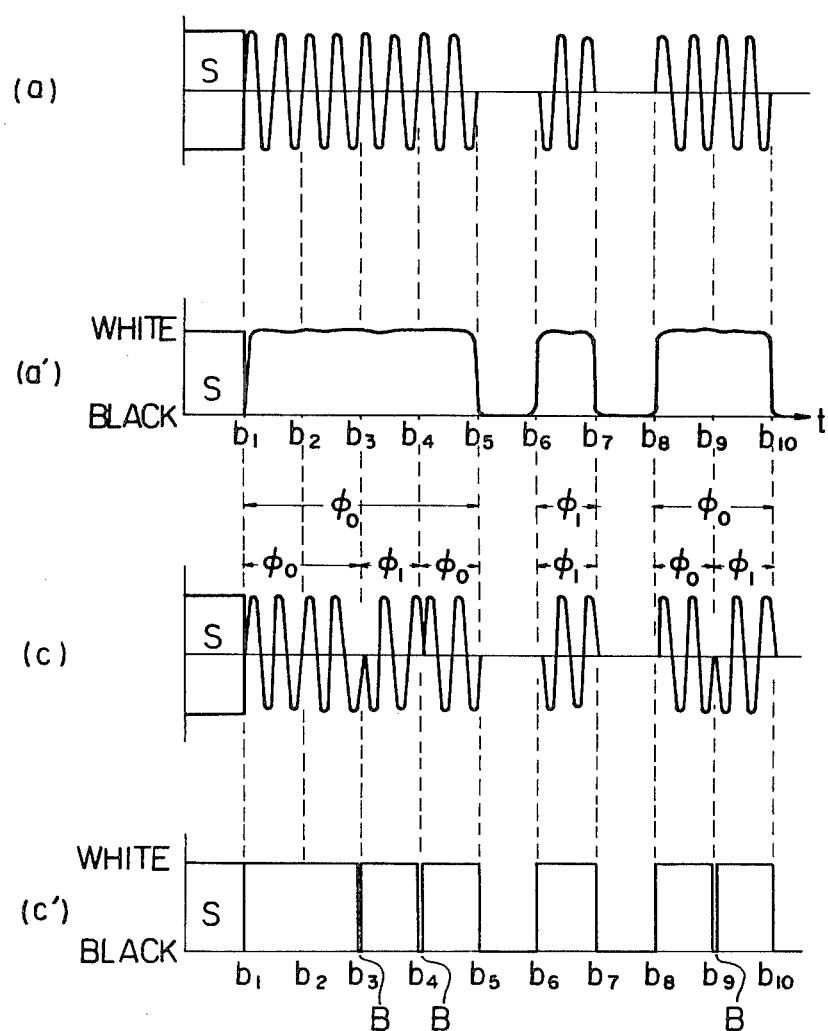

FIG. 8 shows the operational waveforms of the circuit in FIG. 5(C), when that circuit is applied to AM-PM modulated facsimile signals. In FIG. 8, (a) shows the input AM-PM facsimile signal, (a') is the base band signal of the waveform (a), (c) is the superposed output signal at the output terminal (r), and (c') is the base band signal of the waveform (c). It should be understood that the output signal on the waveform (c) is inverted at the timing $b_3$, $b_4$ and $b_9$. Therefore, the demodulated signal (waveform (c')) has a thin spot of black signal B at the timing $b_3$, $b_4$ and $b_9$. Thus, an additional pattern is inserted as a black spot in an original picture.

Next, some modifications of the present facsimile superposing system will be described.

Figure 9A:
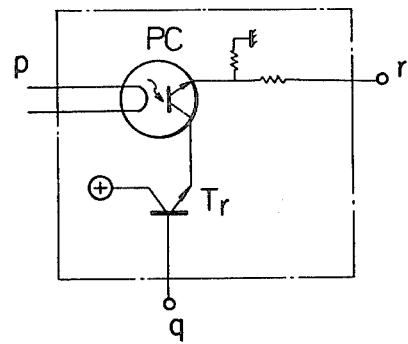
FIG. 9(A) and FIG. 9(B) are modifications of the insertion circuit.
Figure 9B:
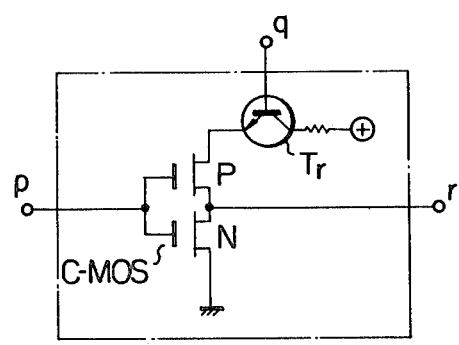

FIG. 9(A) and FIG. 9(B) are two alternatives of the insertion circuit in FIG. 5(A). In FIG. 9(A), the photo-coupler PC is controlled to be either conductive or cut off by the insertion signal at the terminal (q) through the driver transistor Tr. Then, when the photo-coupler is cut off the input facsimile signal is suppressed. In FIG. 9(B), the complementary metal-oxide-semiconductor C-MOS is controlled to be conductive or cutoff by the insertion signal at the terminal (q), and of course when that C-MOS is cutoff, the facsimile signal is suppressed.

It should be understood that many other modification of the insertion circuit, are possible to those skilled in the art as long as that insertion circuit can be switched by the insertion signal.

Figure 10:
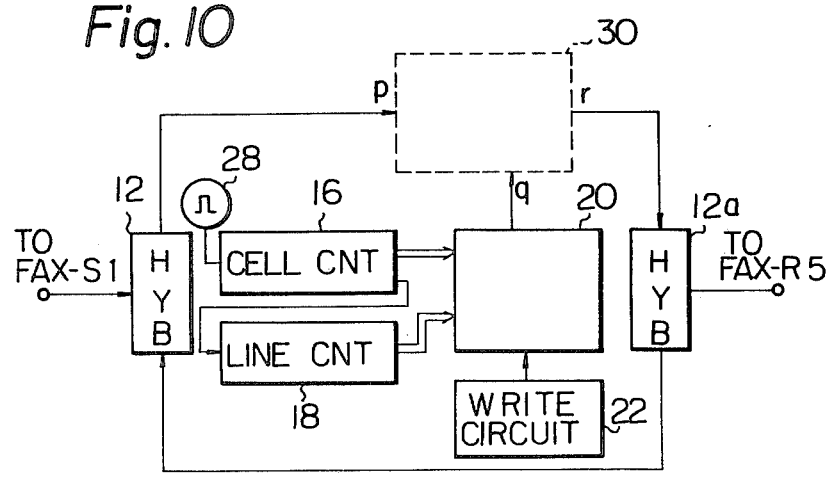
FIG. 10 is the simplified modification of the apparatus in FIG. 3.

FIG. 10 is a modification of the facsimile superposing apparatus, and the same reference numerals as those in FIG. 3 show the same members. In FIG. 10, means for clearing or initializing the cell counter 16 and the line counter 18 are omitted. Therefore, the additional pattern is superposed in an out-of synchronization condition, although the line repetition rate is the same, and the superposed pattern will be divided into an upper portion and lower portion, or a left portion and right portion. However, if the pattern to be superposed has many repetitions of the same string of characters, the superposed pattern is readable somewhere on the received copy. So, FIG. 10 provides a simplification of the facsimile superposing apparatus.

Further, it should be understood that the present facsimile superposing apparatus can be inserted not only in the repeater or the exchange system, but also in the facsimile transmitter or receiver, or an attachment of the facsimile transmitter or receiver.

As mentioned above, according to the present invention, the superposing of the desired pattern is performed with a simple apparatus without demodulating the facsimile signal to the base band signal. Therefore, the superposing is performed without deteriorating the picture quality.

From the foregoing it will now be apparent that a new and improved facsimile superposing system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A facsimile superposing system for superposing an additional pattern on an original pattern comprising an input means for receiving the analog type original facsimile pattern signal modulated by either the AM, AM-PM, FM, or PM systems, a digital memory having the capacity enough to store the additional pattern to be superposed, an insertion circuit having a first input terminal connected to said input means, a second input terminal connected to the output of said digital memory and an output terminal for providing the sum of the first and the second input terminal signals, a write circuit connected to said digital memory for writing a desired pattern into the memory, an address circuit including a cell counter and a line counter both connected to said memory for addressing said digital memory, said cell counter having the capacity equal to the number of cells in a single scanning line of the original pattern and the line counter having the capacity enough to count the number of scanning lines of the additional pattern, a cell clock generator to increment said cell counter and the frequency of which is equal to the scanning frequency of the original pattern, said line counter being incremented by the overflow pulse of said cell counter, and output means connected to the output terminal of said insertion circuit.

2. A facsimile superposing system according to claim 1, further comprising means for initiating said address circuit when a confirmation receive signal from the reception side is detected.

3. A facsimile superposing system according to claim 1, wherein said insertion circuit has means for suppressing the amplitude of the signal at the first input terminal according to the signal at the second input terminal, and the original facsimile pattern is modulated by the AM or AM-PM systems.

4. A facsimile superposing system according to claim 1, wherein said insertion circuit has an oscillator for providing the picture frequency, the first input terminal and the output of said oscillator are alternatively connected substantially according to the signal at the second input terminal, and the original facsimile pattern is modulated by the AM, FM, or AM-PM systems.

5. A facsimile superposing system according to claim 1, wherein said insertion circuit has means for inverting the phase of the first input terminal signal according to the signal at the second input terminal, and the original facsimile pattern is modulated by the AM-PM or PM systems.

* * * * *